(12) United States Patent
Gravelle et al.

(10) Patent No.: US 10,604,343 B2
(45) Date of Patent: Mar. 31, 2020

(54) STORAGE AND RETRIEVAL SYSTEM

(71) Applicant: Attabotics Inc., Calgary (CA)

(72) Inventors: Scott Gravelle, Calgary (CA); Robert Guy Cowley, Okotoks (CA); Anthony Brian Woolf, Calgary (CA)

(73) Assignee: Attabotics Inc., Calgary (CA)

( * ) Notice: Subject to any disclaimer, the term of this patent is extended or adjusted under 35 U.S.C. 154(b) by 0 days.

(21) Appl. No.: 16/354,104

(22) Filed: Mar. 14, 2019

(65) Prior Publication Data

US 2019/0233209 A1  Aug. 1, 2019

Related U.S. Application Data

(63) Continuation of application No. 15/568,646, filed as application No. PCT/CA2016/050484 on Apr. 26, 2016, now Pat. No. 10,336,540.

(60) Provisional application No. 62/153,189, filed on Apr. 27, 2015.

(51) Int. Cl.
   *B65G 1/04* (2006.01)
(52) U.S. Cl.
   CPC ......... *B65G 1/0464* (2013.01); *B65G 1/0478* (2013.01)
(58) Field of Classification Search
   CPC .. B65G 1/0464; B65G 1/0414; B65G 1/0478; B65G 1/0492; B65G 1/02; B65G 1/065; B65D 88/022
   See application file for complete search history.

(56) References Cited

U.S. PATENT DOCUMENTS

| | | | | |
|---|---|---|---|---|
| 4,817,071 A | * | 3/1989 | Carlson | G11B 17/225 360/98.06 |
| 8,628,289 B1 | * | 1/2014 | Benedict | B65G 1/0478 414/217 |
| 9,315,320 B2 | * | 4/2016 | Kawano | B65G 1/0407 |
| 2008/0131241 A1 | * | 6/2008 | King | B65G 1/0435 414/267 |

FOREIGN PATENT DOCUMENTS

| | | | | |
|---|---|---|---|---|
| CA | 2885984 A1 | * | 5/2014 | ........... B65G 1/0464 |
| EP | 0599032 A1 | * | 6/1994 | ............... B65G 1/02 |
| JP | H0524606 U | * | 3/1993 | ............. B65G 1/023 |
| WO | WO-2015019055 A1 | * | 2/2015 | ........... B65G 1/0464 |

* cited by examiner

*Primary Examiner* — Glenn F Myers
(74) *Attorney, Agent, or Firm* — Kyle R Satterthwaite; Ryan W. Dupuis; Ade & Company Inc.

(57) ABSTRACT

Bins or other storage units contained within a three-dimensional grid structure are arranged in cells, each of which has multiple storage units surrounding a central void or space on different sides thereof. This void space is slightly larger than each storage unit, enabling the unit to be pulled into the void by mechanical means, and allowing access to the bins on all sides of the void. The storage units are stacked within the three-dimensional grid structure, which can be built or expanded to a predetermined footprint. The aligned voids of stacked cells create vertical shafts spanning between upper and lower tracks of the grid structure on which robotic retrieval vehicles can horizontally travel to and from any given shaft. The robotic retrieval vehicles can directly access any storage unit via the vertical shafts.

23 Claims, 8 Drawing Sheets

STORAGE AND RETRIEVAL SYSTEM

CROSS REFERENCE TO RELATED APPLICATIONS

This application is a continuation of U.S. Non-provisional patent application Ser. No. 15/568,646, which has 371(c) date of Oct. 23, 2017, and which is a national stage of PCT Application No. PCT/CA2016/050484, filed Apr. 26, 2016, which claims benefit under 35 U.S.C. 119(e) of U.S. Provisional Patent Application No. 62/153,189, filed Apr. 27, 2015, all of which are incorporated herein by reference in their entirety.

FIELD OF THE INVENTION

The present invention relates generally to the technical field of logistics and storage and retrieval systems, and more specifically to a three dimensional storage and retrieval system in which storage cells featuring multiple storage locations disposed around a central void are stacked in alignment with one another such that the central voids in each stack form a central shaft by which storage/retrieval vehicles can access every storage location from upper and lower track grids above and below the stacked array of storage locations.

BACKGROUND

Grid-based three dimensional storage and retrieval systems employing robotic storage/retrieval vehicles are known in the art, including those disclosed in Canadian patent application CA2885984, German patent application DE102009017241, U.S. Pat. No. 8,628,289, U.S. patent application US2014/0031972 and international PCT applications WO201490684 and WO201519055.

The PCT applications disclose systems in which the robotic storage/retrieval vehicles traverse an upper grid supported in an elevated position over a three dimensional array of stacked storage bins, and each vehicle features a lift device that can be lowered down from the vehicle when parked on the grid in a position overlying a selected stack of storage bins, whereby the lifting device carries the storage bin up into a cavity in the underside of the vehicle. CA2885984 discloses a similar system, but in which two different three dimensional arrays are situated one over the other, with a respective fleet of robotic storage/retrieval vehicles traversing a respective grid above each storage array. In these types of systems, while the presence of a respective stack of storage bins at every Cartesian coordinate point of the horizontal grid provides a space-efficient storage solution, a potential drawback of such a system is that only the uppermost bin in any stack is directly retrievable any given time. Access to bins further down the stack requires prior removal of the bins above it.

The German reference features an upper two-level storage array, and a lower single-level storage array, and a fleet of robotic storage/retrieval vehicles operating on a gridded track system situated between the upper and lower arrays. The robotic vehicles can access storage bins from not only the lower array, but also from and the lower level of the top array, thereby enabling access to more than just the uppermost bins in the multi-level upper array.

US2015127143 discloses a robotic storage/retrieval vehicle capable of simultaneously lifting multiple storage bins from a stack in a three dimensional storage array, thereby reducing the number of discrete lifting operations required to access a given bin that is buried below two or more of the uppermost bins in the stack. Once upper bins have been removed by this multi-bin vehicle, a conventional single-bin storage/retrieval vehicle can then lift the target bin. A potential drawback is the need for two distinct vehicle types that separately access and then remove the target bin.

US2014/0031972 and U.S. Pat. No. 8,628,289 both avoid the multi-level access problem by employing an aisle-based format, where open aisles between rows of stacked storage locations enable robotic item retrieval from any location, though at the expense of a less space efficient solution, as the open aisles between every two rows take up a significant volume of the overall system space.

U.S. Pat. No. 5,595,263 discloses a single-stack storage and retrieval system in which storage locations at each level of the stack are situated around a hollow central shaft, but retrieval from the storage locations is performed by externally mounted robotic pickers and cooperating elevators that feed a dedicated lower conveyor of the single-column storage array. Other single-stack storage facilities are disclosed in U.S. patent application 2006/0228196, Japanese patent reference JP2003341810 and French Patent FR2614609.

U.S. patent application 2013/0181586 discloses a rotary unit with a plurality of bin holders radially attached to a central shaft for input and output of goods from a computer controlled, robotically served storage system, but provides no improvement to the actual storage layout itself.

U.S. Pat. No. 7,267,518 discloses a conveyor system for collecting and moving material among a two-dimensional array of storage bins, but is only capable of serving a single-level two-dimensional array of storage sites, not a multi-level three-dimensional array.

Accordingly, there remains room for improvements and alternative designs in the field of three-dimensional storage/retrieval systems, and particularly a desire for improved balance between space-efficiency and individual location access within three dimensional storage and retrieval systems.

Applicant has developed a novel storage and retrieval system with a unique combination of features not heretofore seen or suggested in the prior art, and which not only alleviate the forgoing shortcomings of the prior art, but may also provide other advantages or benefits.

SUMMARY OF THE INVENTION

According to a first aspect of the invention, there is provided a storage system comprising:
  a gridded three dimensional structure comprising:
    a plurality of storage cells arranged in stacks and each comprising a plurality of storage locations disposed around a central void on different respective sides thereof, each unit space being sized to accommodate a respective storage unit therein;
    each stack comprising a respective group of the storage cells residing in stacked relation one over another with the central voids of said respective group of the storage cells aligned with one another to form a respective upright central shaft of said stack;
    each central upright shaft being sized to accommodate the respective storage units of the respectively group of storage cells within said upright shaft to enable retrieval of said respective storage units through said upright central shaft; and
  a gridded track system on which one or more storage/retrieval vehicles are conveyable to and from the upright central shafts and conveyable through said upright shafts to access the storage locations therefrom; and at least one storage/retrieval vehicle conveyable to, from and through the upright central shafts via the gridded track system;

wherein the stacks of the gridded structure include full-sided stacks in which the upright central shaft is surrounded by the storage locations of the respective group of storage cells on all sides of said upright central shaft, and said storage/retrieval vehicle is operable in a plurality of different working positions inside the shaft of each full-sided stack to access the storage locations on said all sides of said upright central shaft of the full-sided stack.

According to a second aspect of the invention, there is provided a storage system comprising a grid structure of storage cells, at least some of which each have four storage locations arranged around a void space to accommodate an arrangement of four bins around a vertical shaft at 90-degrees to one other, the grid structure having a top and bottom level, and a vehicle or robot, arranged to move horizontally in two dimensions at both the top level and the bottom level, and move vertically up and down between the top and bottom levels through the void spaces in the grid structure to receive or store a storage bin in any a storage cell at any one of the four storage locations arranged around the void space.

According to a third aspect of the invention, there is provided a storage/retrieval vehicle for use in a gridded storage structure comprising at least one stack of storage cells in which each storage cell comprises four storage locations situated on four different sides of an upright central shaft of said stack for storing respective storage units within said storage locations in a manner accessible from said upright central shaft by the storage/retrieval vehicle, said storage/retrieval vehicle comprising a rotatable turret and an extendable arm selectively extendable to a deployed position reaching outwardly beyond a perimeter of said turret, said turret being rotatable into four different working positions, in each of which extension of the extendable arm will deploy said extendable arm outwardly from the turret from a different respective side of the vehicle to access a respective one of said four storage locations on said four different sides of the upright central shaft of the stack of storage cells.

According to a fourth aspect of the invention, there is provided a storage/retrieval vehicle for use in a gridded storage structure comprising at least one stack of storage cells in which each storage cell comprises four storage locations situated on four different sides of an upright central shaft of said stack for storing respective storage units within said storage locations in a manner accessible from said upright central shaft by the storage/retrieval vehicle, said storage/retrieval vehicle comprising a platform for receiving a storage unit thereon, and raiseable and lowerable fences disposed around the platform on four sides thereof, wherein a raised condition of the fences is arranged to block sliding of a retrieved storage unit off of the platform, and the storage/retrieval vehicle is operable in four different working positions each enabling loading or unloading of a storage unit onto or off the platform by placing of a respective one of the raiseable/lowerable fences in a lowered condition at a respective one of the four different sides of the platform.

BRIEF DESCRIPTION OF THE DRAWINGS

One or more preferred embodiments of the invention will now be described in conjunction with the accompanying drawings in which.

In the drawings like characters of reference indicate corresponding parts in the different figures.

DETAILED DESCRIPTION

Figure 1:
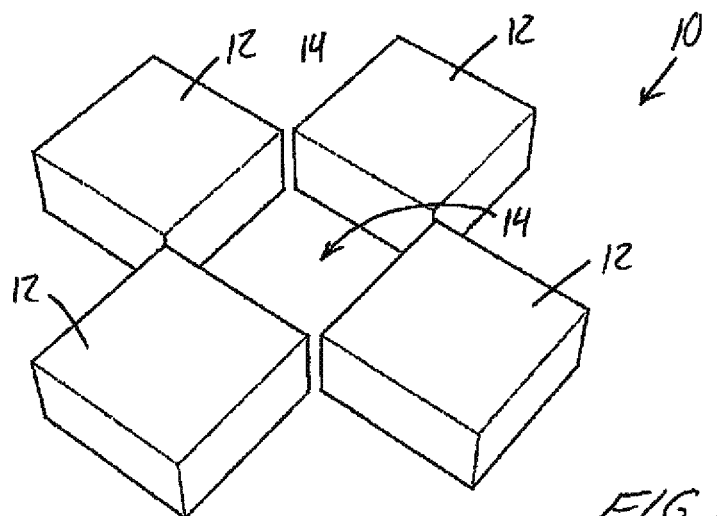
FIG. 1 is a schematic perspective view of a four-bin central-void storage cell format of a three dimensional storage and retrieval grid structure used in one embodiment of the present invention.

FIG. 1 illustrates a singular storage cell 10 used within a three dimensional storage system according to the present invention. Each full cell features four storage units 12, for example in the form of open-top or openable/closeable storage bins capable of holding any variety of goods therein. Each storage unit 12 resides within a respective rectangular volume of space on a respective side of a central void 14 of rectangular volume, whereby the four storage units 12 collectively surround the central void 14 on all four peripheral sides thereof, while leaving the top and bottom of the central void open. These cells are compiled into a space-efficient three dimensional storage array in an organized manner by which every storage unit resides at an addressable storage location in the array that is directly accessible at all times regardless of the occupied or unoccupied status of every other storage location by its respective storage unit.

Figure 2:
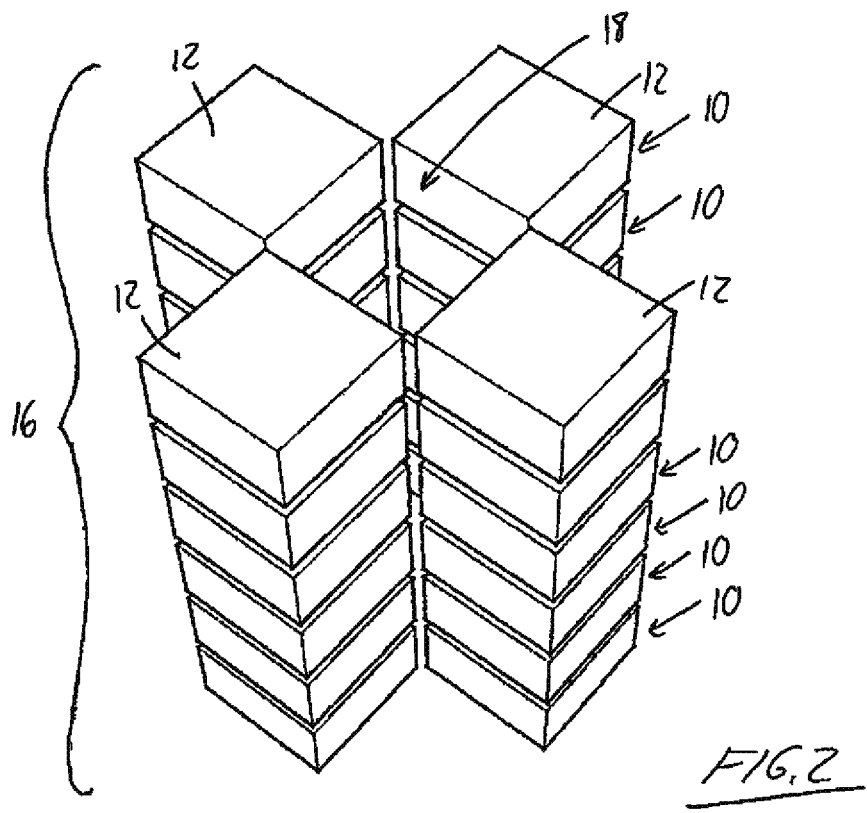
FIG. 2 is a schematic perspective view of a stack of storage cells whose aligned central voids create a vertical shaft through which the four bins of each cell are accessible.

FIG. 2 illustrates a vertical stack 16 in which each layer or level is occupied by a respective full storage cell 10. The stacked storage cells are positioned in alignment with one another, whereby the central voids of all the stacked cells are aligned to create a central upright shaft 18, and each storage location and respective storage unit aligns with a respective storage location and storage unit in each of the other stacked cells. Accordingly, a respective vertical column is formed by the aligned storage locations and storage units on each side of the upright shaft 18. The stack 16 in FIG. 2 is a full-sided stack, in that each of its cells has a full set of four storage locations disposed around its central void, and so the stack features four vertical columns of storage locations and storage units. The hollow upright shaft 18 formed by the aligned voids of the stacked cells passes vertically through the entire stack from the open top of the uppermost cell's central void to the open bottom of the lowermost cell's central void.

Figure 3:
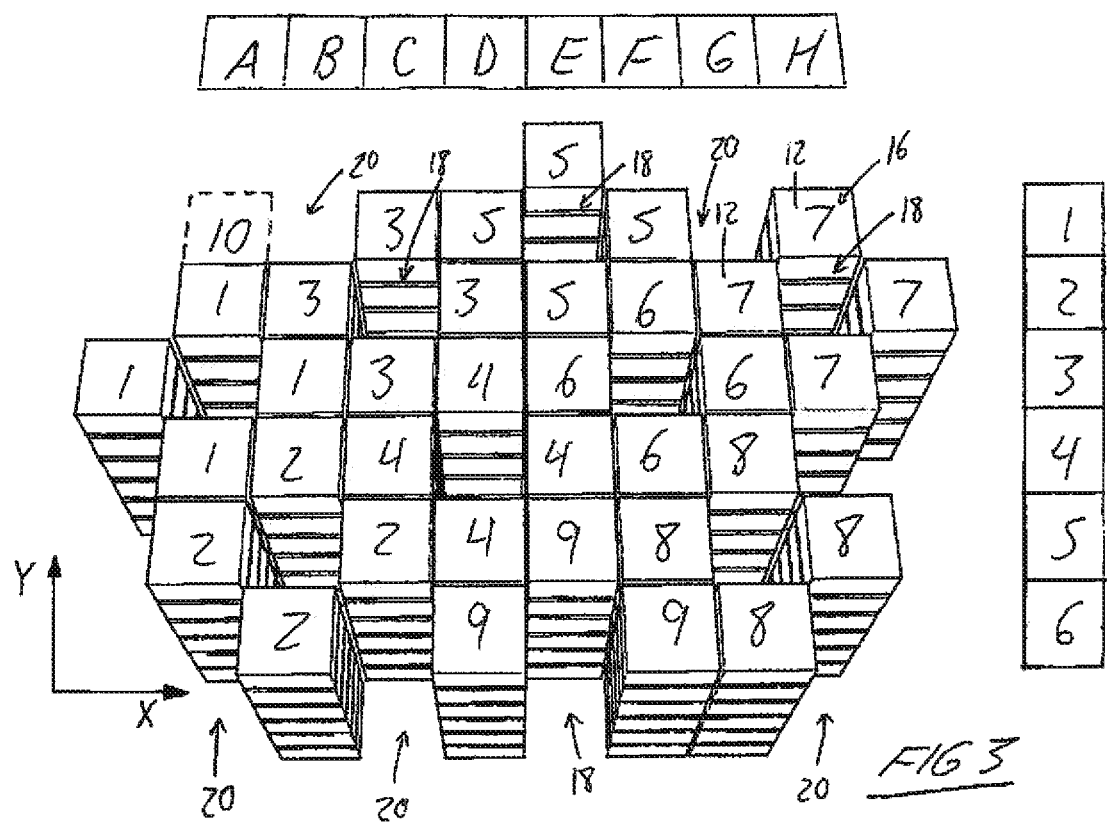
FIG. 3 schematically illustrates arrangement of multiple stacks of storage cells placed in neighbouring relation to one another to create a larger three dimensional storage array over which the spaced-apart hollow shafts of the different stacks enable direct access to each and every storage bin in the overall array.

FIG. 3 illustrates placement of a plurality of stacks beside one another to form a three dimensional collection of storage units, in which the stacks have numbered sequentially from 1 to 9 for reference. Referring back to FIG. 2, the stacked cells and the central voids thereof may be interpreted as occupying five blocks of a square nine-block reference grid in a horizontal reference plane, while the four corner blocks of the nine-block grid are unoccupied by the storage units of the stack. Turning again to FIG. 3, the plurality of stacks fit together in a mating fashion, wherein at least one empty corner of each stack's nine-block reference grid is occupied by a respective vertical column of an adjacent one of the stacks, while the central upright shaft of each stack remains open. It is by way of this central upright shaft 18 that each and every storage location throughout the stack is accessible. So with continued reference to FIG. 3, in which X and Y directions are marked in a horizontal reference plane, the corner-mated relation of the stacks can result in runs of four directly adjacent vertical columns (i.e. up to four neighbouring vertical columns lacking any empty voids between them) in both the X and Y directions, without defeating the accessibility of any vertical column from the upright shaft of its respective stack. Accordingly, a highly optimized balance is achieved between a space efficient three dimensional layout of storage locations and readily available access to any and all of the storage locations.

Of the nine labelled stacks in FIG. 3, stacks 1 through 8 are each full-sided stacks in which each storage cell has a full set of four storage units occupying the four respective storage locations around the cell's central void. Stack 9 on the other hand is a reduced stack from which one vertical column of storage locations and storage units has been omitted, thereby leaving only three vertical columns partially surrounding the respective upright shaft 18 on three sides thereof. Each cell of stack 9 is therefore a reduced cell having only three storage locations, thus being capable of storing a maximum of three storage units in the cell at any given time. The inclusion of reduced stacks in a collection enables building of the storage array to fit within a targeted rectangular grid size in the horizontal reference plane, while occupying the greatest possible number of blocks within this target grid size. The horizontal reference plane in FIG. 3 has been labelled with a target grid size of six by eight, in which the six grid rows have been numbered as 1 through 6 and the eight grid columns labelled as A through H.

In order to achieve this target grid size, stacks 5 and 7 would both need to also be trimmed to a reduced stack of three columns, like stack 9. To optimize the number of storage locations in this target grid size, a single-column reduced stack 10 could also be added in the top left corner of the Figure. Looking at row 6, it will be seen that in addition to the central shaft 18 of reduced stack 9, by which the storage locations of stack 9 are all accessible, row 6 also contains three additional shafts 20 in grid columns A, C and H. These shafts are defined by unoccupied corners of respective stacks of storage cells. Shafts such as these that reside at the outer perimeter rows and columns of the reference grid and do not define the central shafts of respective stacks are referred to herein as outer shafts. For example, grid row 1 in FIG. 3 features two such outer shafts 20 at grid columns B and G, and would have a third outer shaft at grid column A if optional single-column stack 10 were omitted. As outlined below, these outer shafts provide vertical travel paths by which robotic retrieval vehicles can traverse between gridded track layouts above and below the stacks 16 during return of previously retrieved storage units to the stacks, while keeping central upright shafts of the stacks free for retrieval of other storage units from the stacks.

Figure 4:
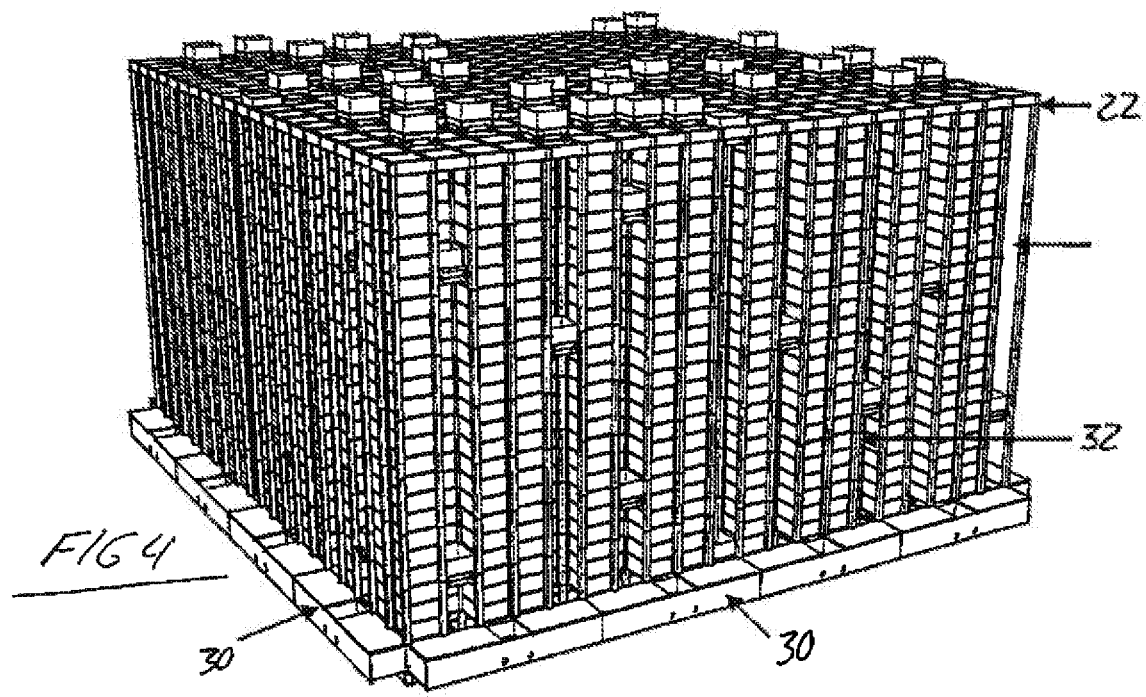
FIG. 4 illustrates a fully completed grid structure containing a three dimensional array of stacked storage cells that is navigable by a fleet of identical robotic storage/retrieval vehicles that horizontally traverse gridded track layouts at the top and bottom of the array, and vertically traverse between the upper and lower gridded track layouts through the vertical shafts to retrieve and return storage bins at any storage location in the array.

FIG. 4 illustrates a completed three dimensional grid structure employing the stacked storage cell configuration described above with reference to FIGS. 1 to 3. In the completed grid structure, a gridded upper track layout 22 resides above the stacks 16, and a matching gridded track layout 24 resides beneath the stacks 16. The lower gridded track layout 24 at the bottom of the three dimensional grid is surrounded on the four sides thereof by delivery stations 30 to which the robotic retrieval vehicles deliver the storage units pulled from the stacks.

Figure 5:
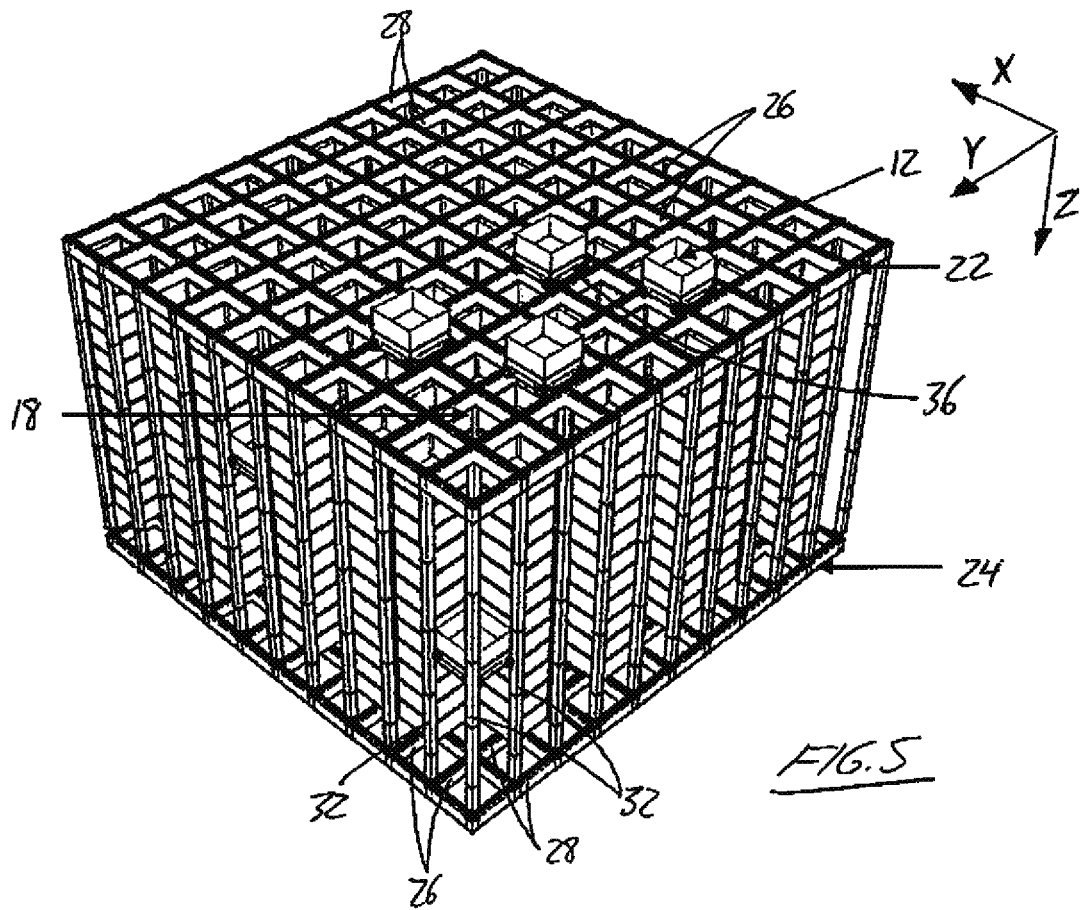
FIG. 5 shows another completed grid structure similar to that of FIG. 4, but from a closer viewing plane to better reveal framework details of the grid structure.

As better shown by the similar three dimensional grid structure in FIG. 5, which is of smaller grid size and height than that of FIG. 4 and is shown at greater scale with the delivery stations 30 omitted, each track layout features a set of X-direction rails 26 lying in the X-direction of the horizontal reference plane and a set of Y-direction rails 28 perpendicularly crossing the X-direction rails in the Y-direction of the reference plane. The crossing rails 26, 28 define the horizontal reference grid of the storage system, where each grid row is delimited between an adjacent pair of the X-direction rails 26 and each grid column is delimited between an adjacent pair of the Y-direction rails 28. Each intersection point between one of the grid columns and one of the grid rows denotes the position of a respective column of storage cells, a respective central shaft, or a respective outer shaft. In other words, each column of storage cells, each central upright shaft of a stack, and each outer shaft resides at respective Cartesian coordinate point of the reference grid at a respective area bound between two of the X-direction rails and two of the Y-direction rails. The three-dimensional addressing of each storage location and associated storage unit in the completed system is completed by the given vertical level at which the given storage location resides within the respective stack. That is, a three-dimensional address of each storage location is dictated by the grid row, grid column and stack level of storage location in the three dimensional grid.

With continued reference to FIG. 5, a respective upright frame member 32 spans vertically between the upper and lower grid layouts 22, 24 at each intersection point between the X-direction and Y-direction rails, thereby cooperating with the rails to define a framework of the three-dimensional grid structure for containing and organizing the three dimensional array of storage cells within this framework. As a result, the central upright shaft 18 of each stack of storage cells and each outer shaft 20 of the three dimensional storage array has four vertical frame members 32 spanning the full height of the shaft at the four corners thereof.

Figure 12:
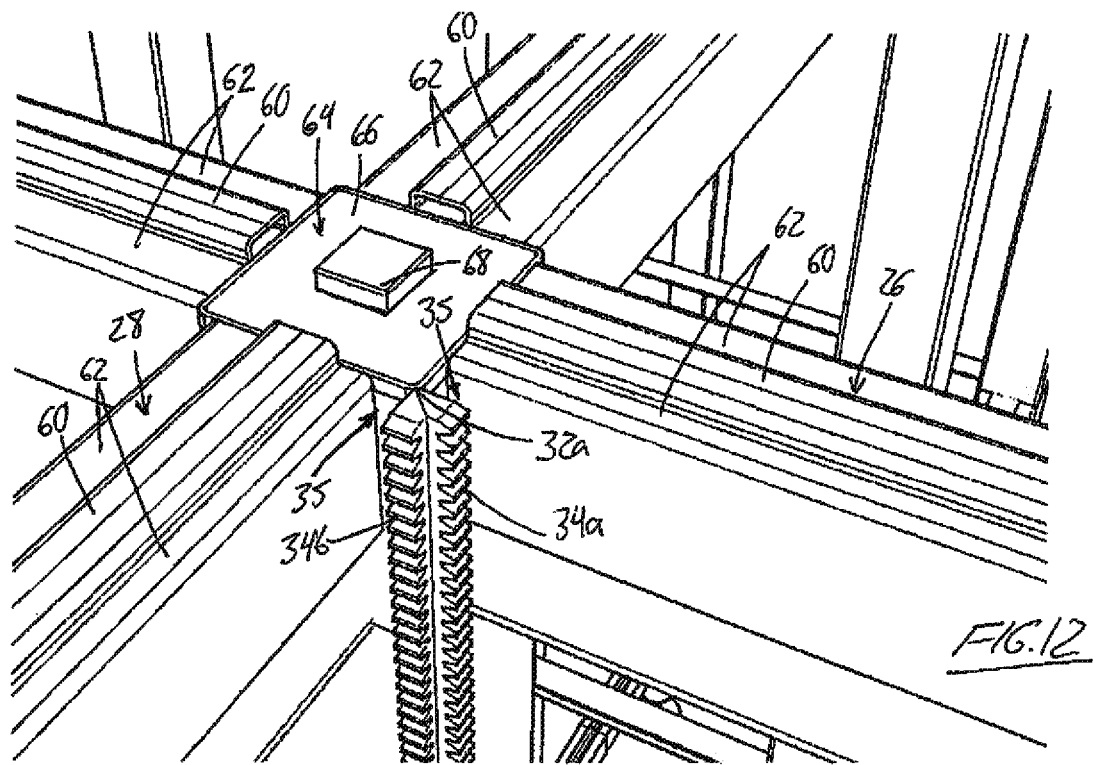
FIG. 12 is a close-up perspective view of a portion of the three dimensional grid structure of FIG. 11A at a top level thereof, where horizontal tracks of the upper gridded track layout intersect with one of multiple rack members that reside at the corners of each vertical shaft in the storage array to cooperate with toothed pinion wheels of each robotic storage/retrieval vehicle to enable vertical traversal of the shaft by each vehicle.

Turning momentarily to FIG. 12, each frame member has a square horizontal cross-section whose four sides lie in the X and Y directions of the horizontal reference grid, and so for each central or outer shaft of the three dimensional storage array, each of the four frame members at the corners of the shaft has a respective corner edge 32*a* facing diagonally into this shaft. Respective sets of rack teeth 34*a*, 34*b* extend from the frame member 32 at the two sides of the frame member 32 that perpendicularly intersect at this corner edge 32*a*, the teeth of each set being arranged in series in the vertical Z-direction of the three dimensional grid. One set of teeth 34*a* thus face in the X-direction along the X-direction rail 26 at one side of the shaft, while the other set of teeth 34*b* face in the Y-direction along the Y-direction rail 28 at a perpendicularly adjacent second side of the shaft. Accordingly, each of the frame members at the four corners of each central or outer shaft defines a toothed rack member having two sets of teeth 34*a*, 34*b* that face inwardly along respective sides of the shaft toward the opposing corner on the same side of the shaft. The X-direction teeth 34*a* are spaced a short distance from the X-direction rail 28, and the Y-direction teeth 34*b* are likewise spaced a short distance from the Y-direction rail 28, whereby a gap 35 exits between each set of the teeth and the respective rail. Each shaft thus has eight sets of rack teeth in total, with two sets at each corner of the shaft. As described in greater detail below, the rack teeth 34*a*, 34*b* cooperate with pinion wheels on the robotic retrieval vehicles to enable traversal of same between the upper and lower track layouts through the central and outer shafts of the three dimensional grid structure.

Each rail and each frame member is assembled from modular pieces so that the three dimensional grid structure can be expanded at any given time, both in the horizontal X-Y dimensions of the reference grid and the vertical Z-direction to increase the number of storage cell stacks and/or increase the height (i.e. number of levels) within the storage cells stacks. Each rail is thus made up of modular rail pieces each horizontally connectable between two frame members, which are likewise formed of modular frame pieces vertically connectable to one another in end-to-end relation. To expand the horizontal grid of the structure without adding to the height, additional rail pieces are simply added to horizontally expand the grid side. To increase the height of the three dimensional grid structure, the rails of the upper track layout are temporarily removed, and additional frame pieces are added atop the existing frame pieces to increase the frame height to the targeted level, and the upper rails are re-installed at the top of the now-taller frame members.

Figure 6:
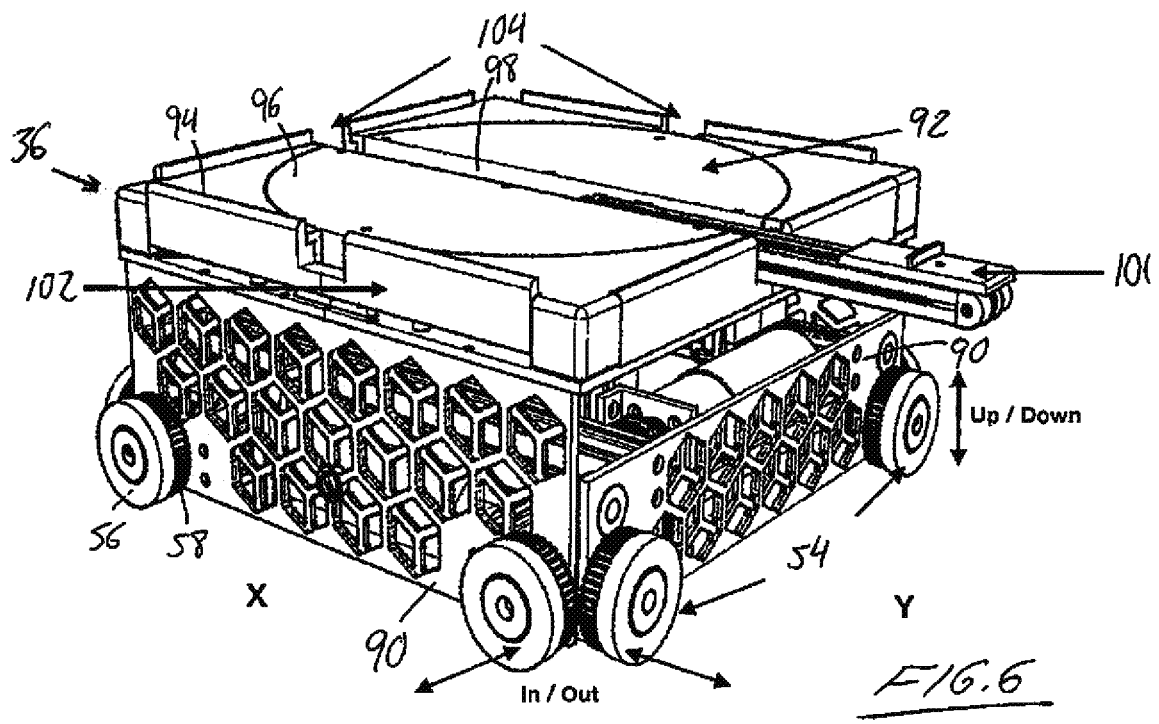
FIG. 6 is a perspective view of one of the robotic storage/retrieval vehicles from FIGS. 4 and 5, illustrating operation of an extendable aim thereof for withdrawing and replacing a storage bin from its designated storage location in the array.
Figure 7:
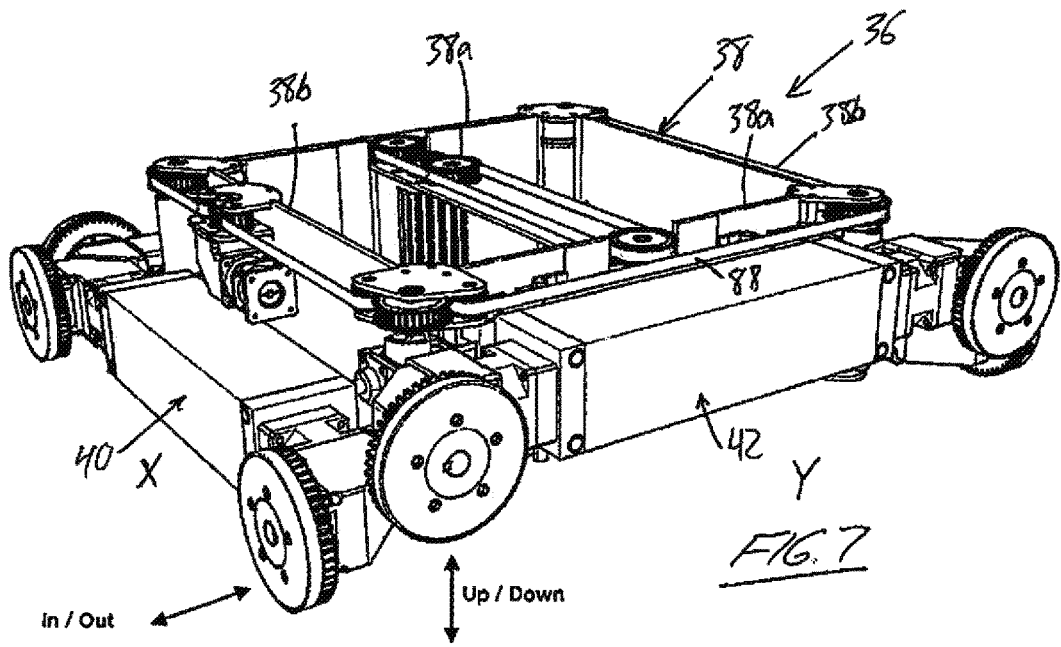
FIGS. 7 and 8 are perspective views of the robotic storage/retrieval vehicle of FIG. 6 with select elements thereof removed to reveal mechanisms for controlling positions of wheel units that are used to horizontally and vertically traverse the grid structure at the track layouts and shafts, respectively.
Figure 8:
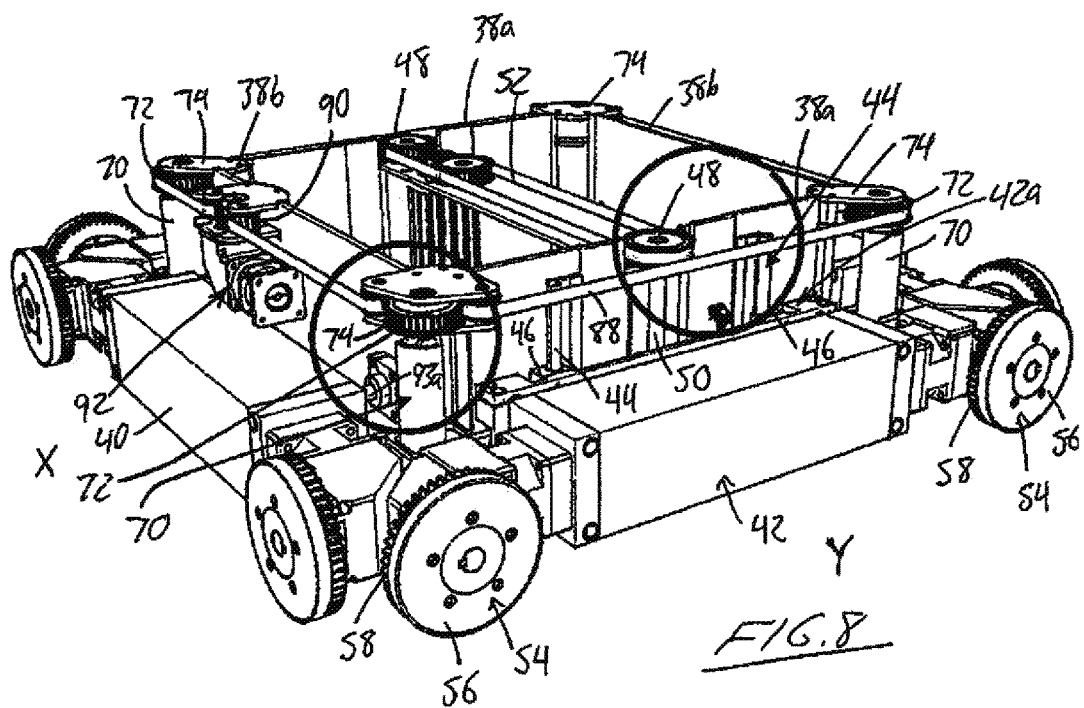

FIGS. 6-8 illustrate one of the robotic retrieval vehicles 36 operable to retrieve the storage units from the three dimensional array to enable pulling one or more products from the retrieved storage unit at one of the delivery stations 30. The retrieval vehicle 36 is also operable to return each retrieved storage unit back to an assigned storage location in the three dimensional array, for example returning it to the same location from which it was retrieved.

With reference to FIGS. 7 and 8, the vehicle features a square frame 38 with four vertical perimeter walls connected end to end at four corners of the frame 38. Of these perimeter walls, one opposing pair of perimeter walls 38*a* denote two Y-oriented sides of the vehicle that lie in the Y-direction of the reference grid, while the other opposing pair of perimeter walls 38*b* of the vehicle frame 38 denote two X-oriented sides of the vehicle that lie in the X-direction of the reference grid: A respective X-side wheel carriage 40 is mounted to each of the X-side perimeter walls 38*a* of the frame 38 in a fixed-height position thereon near the bottom edge of the perimeter wall 38*a*. A respective Y-side wheel carriage 42 is mounted to each of the Y-side perimeter walls of the frame 38, but in a height-adjustable manner thereon by which the Y-side wheel carriages 42 can be displaced upwardly and downwardly along the respective Y-side perimeter walls. For this purpose, the exterior of each Y-side perimeter wall 38*a* of the vehicle frame 38 features a pair of vertically upright guide tracks 44 fixed thereto and the Y-side wheel carriage 42 features a pair of slide blocks 46 carried at the inner side of the wheel carriage and slidably mated with the guide tracks for movement of the wheel carriage upwardly and downwardly therealong. These cooperating slide members on the vehicle frame and Y-side wheel carriage are shown in FIG. 8.

A respective drive pulley 48 is supported on each Y-side perimeter wall 38*a* near the top end thereof by way of an out-turned flange reaching outward from the Y-side perimeter wall 38*a* to position the drive pulley's vertical rotation axis slightly outward from the Y-side perimeter wall 38*a*. A threaded drive shaft 50 reaches vertically downward from the drive pulley 48 on the rotation axis thereof, and is threadedly engaged with an internally threaded feature (not shown) on the inner side of the Y-side wheel carriage 42, whereby rotation of the drive pulley 48 in one direction displaces the Y-side wheel carriage 42 upwardly along the guide tracks 44, while rotation of the pulley in the opposing direction displaces the Y-side wheel carriage 42 downwardly along the guide tracks 44. The two drive pulleys have a drive belt 52 entrained thereabout across the interior space delimited by the perimeter walls 38*a*, 38*b* of the square vehicle frame 38, whereby driven rotation of one of these two drive pulleys 48 by a singular motor (not shown) rotates both drive pulleys in concert with one another to lift and lower the Y-side wheel carriages in unison.

Each of the wheel carriages 40, 42 at both the X and Y sides of the vehicle carries two rotatably driven wheel units 54 at opposing ends of the carriage so that these two wheel units 54 reside adjacent the two respective corners of the vehicle frame 38 where this side of the vehicle intersects the two perpendicularly neighbouring sides. The wheel units at the X-sides of the vehicle are rotatable about horizontal axes lying in the Y-direction, whereas the wheel units at the Y-sides of the vehicle are rotatable about horizontal axes lying in the X-direction. Each wheel unit is a singular body defining both a conveyance wheel 56 and a respective pinion wheel 58. The pinion wheel resides inboard of the conveyance wheel (i.e. nearer to the frame 38), and features a gear-toothed periphery for mating engagement with the teeth on the rack members 32 of the three dimensional grid framework.

Turning momentarily again to FIG. 12, the X and Y-direction rails 26, 28 of the gridded track layouts at the top and bottom of the three dimensional grid structure each feature a raised tongue 60 running longitudinally of the rail at a topside thereon. The raised tongue 60 resides at a generally central position across the rail, and leaves a respective flat 62 on each side of the tongue 60. FIG. 12 illustrates an internal intersection point of the upper gridded track layout, where the top end of the frame member 32 features an upper cap 64 with a flat majority area 66 that lies flush with the flats 62 of the X and Y direction rails that intersect with this frame member 32. A raised central area 68 of the cap's topside stands upward from the flat remainder 66 thereof in alignment with the tongues 60 of the intersecting rails 26, 28. The rail pieces that surround each central and outer shaft may differ from the other rails pieces in that the flat 62 on the shaft-adjacent side of the tongue 60 is narrower than the other flat 62 on the other side of the tongue in order to leave the aforementioned gap 35 between the rails and the rack teeth at the corners of the shaft. The other rail pieces that don't border a central or outer shaft may instead be symmetric across the tongue 60 with two flats of equal width. Just as the shaft-bordering rail pieces may differ from the other rail pieces that don't border a shaft, any frame member that does not have a corner facing into a shaft may lack the rack-teeth that are found on the shaft-bordering frame members.

Figure 13:
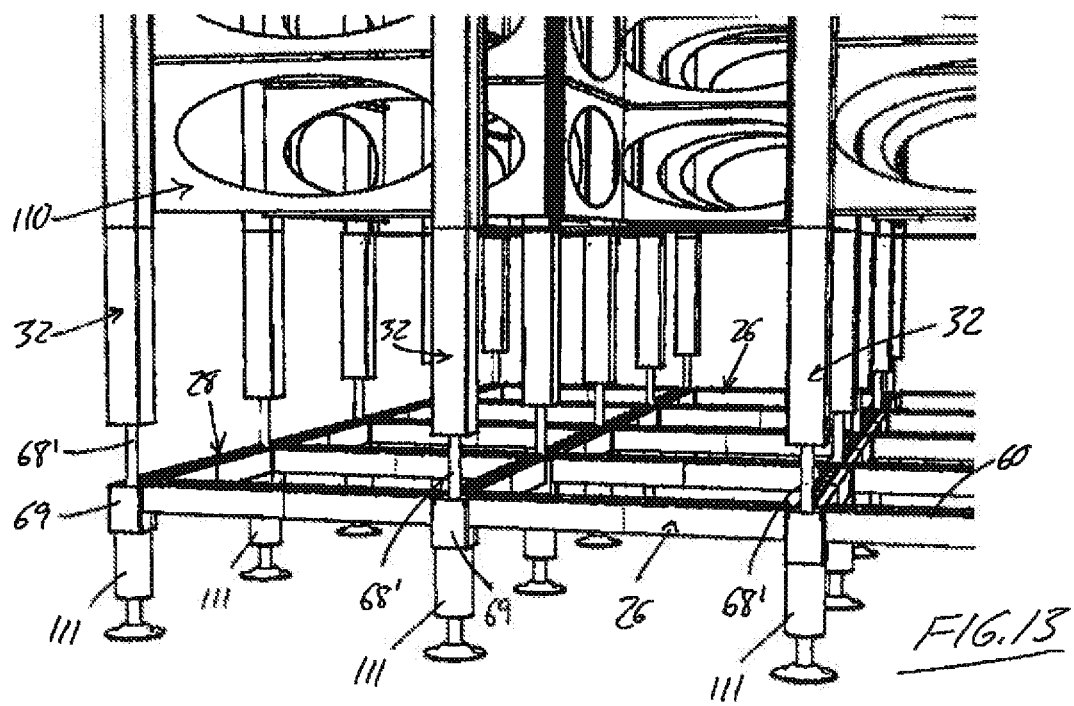
FIG. 13 is a close-up perspective view of a portion of the three dimensional grid structure of FIG. 11A at a bottom level thereof, where horizontal tracks of the lower gridded track layout intersect with the upright rack members.

FIG. 13 shows another intersection of the rails and frame members, but at the lower track layout. Here, the bottom end of each frame member 32 features a reduced portion 68' that vertically joins a base 69 at the bottom end of the frame member 32 to the remainder of the frame member above this reduced portion 68'. The horizontal cross-section of the frame member 32 is lesser at this reduced portion 68' than at the base 69 and upper remainder of the frame member, and more specifically is generally equal to the width of each rail tongue 60 in each of its two horizontal dimensions, just like the raised area 68 of the frame member's top cap 64. The height of the reduced portion 68' of the frame member exceeds the wheel height of the retrieval vehicle 36. The flat topside of the base 69 around the reduced portion 68' is flush with the flats 62 of the track rails 26, 28 of the lower track layout.

Turning back to FIGS. 7 and 8, the drive pulleys 48 and associated motor and threaded shafts 50 thus cooperate with the guide tracks 44 to form a wheel lifting and lowering system operable to raise and lower the Y-side wheel carriages 42 relative to the vehicle frame and the fixed-height X-side wheel carriages 40 so that the Y-side wheel units are raiseable and lowerable relative to the X-side wheel units. In the fully lowered state of the Y-side wheel units, the height-adjustable Y-side wheel units reside at a lower elevation on the vehicle frame 38 than the fixed-height X-side wheel units, whereby the conveyance wheels 56 of the Y-side wheel units are lowered into contact with the flats 62 of a pair of Y-direction rails 28 of the track layout 22/24 for rollable support of the vehicle 36 thereon. Each and every wheel unit is rotatably driven by a respective motor carried by the respective wheel carriage, whereby rotation of the Y-side wheel motors in opposing directions causes displacement of vehicle back and forth in the Y-direction of the track layout. By contrast, in the fully raised state of the Y-side wheel units, the Y-side wheel units reside at a greater elevation on the vehicle frame than the X-side wheel units, whereby the conveyance wheels 56 of the Y-side wheel units are raised out of contact with the flats 62 of the Y-direction rails 28, thereby lowering the X-side wheel units into contact with the flats 62 of two X-direction rails 26 of the track layout for rollable support of the vehicle thereon. Accordingly, rotation of the X-side wheel motors in opposing directions causes displacement of vehicle back and forth in the X-direction of the track layout 22/24. Driving of all four wheels in both the X-side wheel set and Y-side wheel sets is preferable to ensure proper vehicle alignment in the horizontal track conveyance of the vehicle, through driving of each wheel unit separately is not as essential during horizontal track conveyance, as compared to vertical shaft conveyance where independent operation of the wheels in opposite rotational directions at each side is of greater significance in order to maintain proper alignment and balance of the vehicle during rack-and-pinion conveyance of the vehicle through the shaft.

Referring again to FIG. 12, the flat majority 66 of the topside of the frame member caps 64 at the upper track layout enables rolling motion of the vehicle across the top of each frame member 32 from one rail piece to the next, while the raised central area 68 of the cap 64 cooperates with the rail tongues 60 to maintain alignment of the conveyance wheels 56 on the rails as the vehicle crosses from one rail piece to the next. Likewise, referring to FIG. 13, the flat topside of the base 69 of each frame member 32 forms an extension of the rail flats 62 in order to interconnect the flats of the rail pieces that intersect at this frame member, while the reduced portion 68' of the frame member 32, at frame members that don't reside at outer corners of the grid structure, enables the wheel units of the robotic retrieval vehicle 36 to roll past the frame member in the space around the reduced portion 68' between the base 69 and the upper remainder of the frame member. At each wheel unit, the conveyance wheel 54 residing outboard of the respective pinon wheel 56 has a relatively smooth periphery by comparison to the toothed periphery of the pinion wheel, and may have rubber or other suitable grip material of sufficient frictional coefficient to ensure good drive traction between the conveyance wheels and the rails.

Figure 9:
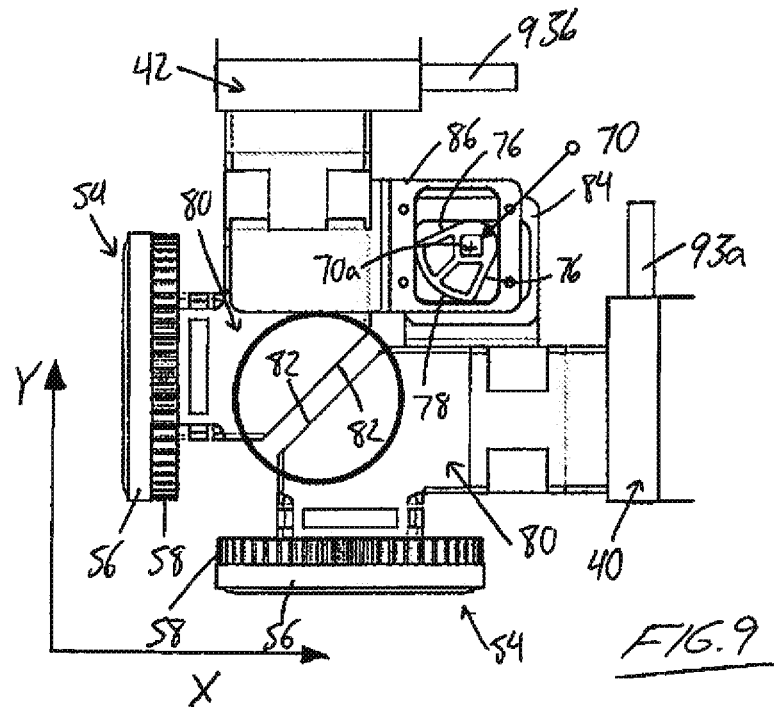
FIGS. 9 and 10 are overhead plan views of revealing further details of a cam-based mechanism for controlling the wheel unit positions in an inboard/outboard direction of the robotic storage/retrieval vehicle.
Figure 10:
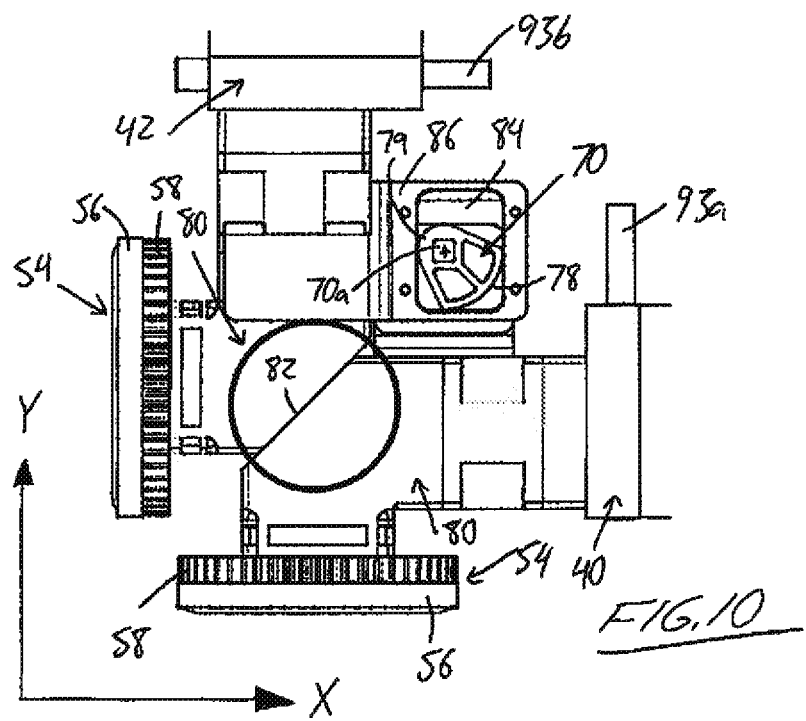

As will be apparent from FIG. 12, placement of the conveyance wheels 54 of the robotic retrieval vehicle in rolling contact with the flats 62 of the rails 26, 28 prevents the robotic retrieval vehicle from dropping down a shaft of the three dimensional grid structure as the vehicle traverses the upper track layout. However, when traveling through a particular shaft, either downwardly from the upper track layout or upwardly from the lower track layout, is required, the wheel units must be retracted inwardly toward the respective sides of the vehicle frame to reduce the outer perimeter of the vehicle (i.e. reduce both the X and Y track width of the vehicle) to a size that is acceptable within the shaft between the crossing rails. Referring again to FIGS. 7 and 8, for this purpose each of the four corners of the square vehicle frame features a respective cam 70 that is operable to selectively control inward/outward movement of both the X-side wheel and corresponding Y-side wheel at this corner of the frame. Each cam 70 is rotatable about a vertical axis 70a by a respective control pulley 72 that is supported on the intersecting perimeter walls of the frame 38 at this corner in a manner rotatable on the same vertical axis as the cam 70. As shown, outwardly reaching support flanges 74 support the control pulley 72 at a location placing its rotational axis outwardly of the frame's perimeter walls 38a, 38b at the respective corner of the frame 38. With reference to FIGS. 9 and 10, in horizontal cross-sectional planes of the cam 70, the cam has two diverging sides 76 reaching outwardly away from the cam's axis in order to widen the cam toward a widened distal face 78 of arcuately convex curvature. Lying across the cam's rotational axis from the distal face 78 of the cam is a narrowed proximal face 79 of arcuately convex curvature of lesser radius than the widened distal face 78. The proximal face resides at a lesser radial distance from the rotational axis of the cam than the opposing distal face.

Each wheel unit 54 is carried by a respective wheel housing 80 at the respective end of one of the wheel carriage. As best shown in FIGS. 9 and 10, at a distal end of the wheel housing 80 furthest from the wheel carriage 40/42 along the direction of the respective perimeter side 38a/38b of the vehicle frame 38, the wheel housing 80 features an angled end wall 82 that lies at 135-degrees to this perimeter side wall direction. At an intermediate portion of the wheel housing between the wheel carriage 40/42 and the angled distal end wall 82 of the wheel housing 80, a hollow camming block 84, 86 extends inwardly from the wheel housing and closes around the respective cam 70. The camming block 86 carried on the movable Y-side wheel carriage 42 is attached to a topside of the respective wheel housing, whereas the camming block 84 on the stationary X-side wheel carriage 40 is attached to the underside of the respective wheel housing. Accordingly, the camming block 86 of the height adjustable Y-side wheel carriage 42 is above the camming block 84 of the fixed-height X-side wheel carriage 40 to allow the Y-side wheel carriage 42 and attached camming block 86 to move upwardly and downwardly relative to the fixed-height X-side wheel carriage 40. Each camming block 84/86 has a hollow rectangular interior which is longer in a direction parallel to the respective side of the vehicle frame on which the camming block is carried than in the other direction perpendicular thereto. That is, the hollow interior of the camming block 86 on the Y-side of the vehicle is longer in the Y-direction than in the X-direction, and the hollow interior of the camming block 84 on the X-side of the vehicle is longer in the X-direction than in the Y-direction.

FIG. 9 shows the cam 70 in an out-turned first position facing its widened distal face 78 outwardly away from the respective corner of the vehicle frame 38, whereby the widened distal face 78 contacts two intersecting sides of the hollow rectangular interior of each camming block 84, 86 at an outermost corner of this camming block interior that is furthest from the respective corner of the vehicle frame in both the X and Y directions. This position of the cam corresponds to placement of both the X-side and Y-side wheel units into their extended outboard positions situated furthest outward from the vehicle frame 38, as the distal face 78 of the cam 70 abuts against the outer one of the two longer sides of the Y-side camming block's hollow interior and against the outer one of the two long sides of the X-side camming block's hollow interior. FIG. 10 illustrates rotation of the cam out of the out-turned position of FIG. 9 toward an opposing in-turned position (not shown) in which the distal face 78 of the cam turns toward an opposing innermost corner of the camming block's interior. FIG. 10 shows the cam at an intermediate state half way between these opposing out-turned and in-turned positions, where the contact of the cam's distal face in the interior of the Y-side's camming block 86 has shifted to the inner one of its two longer sides, thereby shifting the Y-side wheel carriage inwardly toward the frame in the X-direction. Continued rotation of the cam to its in-turned position facing 180-degrees opposite the out-turned position of FIG. 9 will shift the distal face of the cam out of contact with the outer one of the X-side camming block's longer interior sides an into contact with the inner one of the X-side camming block's longer interior sides, thereby shifting the X-side wheel carriage inwardly toward the frame in the Y-direction. The angled distal ends 82 of the two wheel housings 80 at each corner of the vehicle enable placement of the wheels at outermost points from the corner of the vehicle frame 38 so as to reach into engagement with the rack teeth 34a, 34b on the rack members 32 of the three dimensional grid structure without causing interference between retraction of the wheel carriages on the X and Y sides of the vehicle, as shown in FIGS. 9 and 10.

Turning again to FIGS. 7 and 8, a second drive belt 88 is entrained around the cam control pulleys 74 and an input pulley 90 around the exterior of the vehicle frame. The input pulley 90 is operably driven in opposing directions by a reversible electric motor 92. The input pulley, control pulleys, second drive belt, associated motor 92, and cams 70 therefore form a wheel extension and retraction system for displacing the wheel units inwardly and outwardly at the outer perimeter sides of the vehicle. With reference to FIG. 8, to accommodate inward and outward movement of the X-side wheel carriages 40, each X-side wheel carriage is carried on a pair of linearly displaceable plungers 93a spaced apart from one another along the respective perimeter side wall 38b of the frame 38, and slidable back and forth through a respective bushing on the perimeter wall 38b of the frame 38, thereby accommodating the cam-driven movement of the wheel carriage inwardly and outwardly toward and away from the perimeter frame wall 38b. One X-side plunger 93a is visible in FIGS. 8 and 9. Likewise, each Y-side wheel carriage 42 is carried by a pair of sliding plungers 93b respectively disposed adjacent the opposing ends of the wheel carriage 42, except that the plungers are movably supported not by the respective perimeter frame wall 38a, but rather by a displacement unit 42a incorporating the slide blocks and threaded feature by which the Y-side wheel carriage is vertically displaceable on the guide tracks of the respective perimeter frame wall 38a. This displacement unit 42a is therefore vertically displaceable up and down the perimeter frame wall 38a, carrying the Y-side wheel carriage with it, while the Y-side wheel carriage 42 is also horizontally displaceable inwardly and outward toward and away from the displacement unit. One of the Y-side plungers 93b is visible in FIGS. 9 and 10.

With the robotic retrieval vehicle 36 disposed on the upper track layout 22 of the three dimensional grid structure at a co-ordinate point overlying the central shaft of one of the stacks of storage cells, the robotic retrieval vehicle 36 is lowerable into the shaft by the following procedure. First, with the Y-side conveyance wheels lowered into contact with the Y-direction rails 28 to support the vehicle thereon, and the X-side conveyance wheels thus raised off the X-direction rails 26, the cams 70 are rotated from the out-turned position of FIG. 9 to an intermediate position opposite that which is shown in FIG. 10, which retracts the X-side wheel carriage 40 and attached X-side wheel units inwardly, thereby withdrawing them inwardly from over the X-direction rails into positions lowerable into the shaft. Now, the raisable/lowerable Y-side wheel carriages 42 are raised upwardly relative to the vehicle frame, whereby the fixed-height X-side wheel carriages 40 are lowered down into the shaft, bringing the respective pinion wheels 58 into engagement with the X-side rack teeth 34a of the rack members 32 at the corners of this shaft. The gap 35 between each set of rack teeth and the neighbouring rail accommodates the outer periphery of the respective conveyance wheel in this gap while the pinion wheel mates with the rack teeth. With the vehicle now supported by engagement of the X-side pinion wheels 58 with the X-side rack teeth 34a of the rack members 32, the cams 70 are rotated from the current intermediate position (not shown) to the in-turned position (not shown), thereby retracting the Y-side conveyance wheels inwardly off the rails of the upper track layout 22. Motorized rotation of the X-side pinion wheels already engaged with the racks is then used to drive the vehicle further downwardly into the shafting, thereby bringing the Y-side pinion wheels into engagement with the respective sets of rack teeth 34b, at which point driven rotation of all the motorized wheel units is then used to drive the vehicle downwardly through the shaft to a targeted level in the stack of storage cells surrounding this shaft. Prior to driving the X-side wheel units, the Y-side wheel carriages 42 may lowered relative to the vehicle frame down into the shaft and toward or into engagement with the Y-side rack teeth 34b of the rack members 32, at which point both the X and Y side wheels can then be driven.

Similarly, with the robotic retrieval vehicle disposed on the lower track layout 24 of the three dimensional grid structure at a co-ordinate point underlying the central shaft of one of the stacks of storage cells, the robotic retrieval vehicle is raiseable into the shaft by the following procedure. First, with the X-side conveyance wheels seated on the X-direction rails to support the vehicle thereon, the Y-side wheel carriages 40 and attached Y-side wheel units are retracted inwardly by rotating the cams from the out-turned position of FIG. 9 to the intermediate position of FIG. 10. Now, the raisable/lowerable Y-side wheel carriages 42 are raised up in order to lift the retracted Y-side wheel units up into the shaft to place the Y-side pinion wheels into engagement with the Y-side rack teeth 34b of the rack members 32 at the corners of this shaft. With the vehicle now suspended from the rack members by engagement of the Y-side pinion wheels 58 with the Y-side rack teeth 34b of the rack members 32, the X-side wheels are retracted inwardly off the rails by rotating the cam 79 further in the same direction from the intermediate position of FIG. 10 into the in-turned position (not shown). Then, the Y-side wheel units are driven by the respective motors in the required directions to convey the vehicle further upwardly into the shaft, bringing the X-side wheel units into engagement with the X-side rack teeth 34a of the rack members, whereupon all eight wheels are driven to convey the vehicle upwardly through the shaft.

Turning back to FIG. 6, a completed robotic retrieval vehicle includes the vehicle components of FIGS. 7 and 8, and may include optional cover panels 90 affixed to exterior sides of the wheel carriages. An upper support platform 92 is mounted atop the vehicle frame 38, and features an outer deck surface 94 having a round central opening therein in which a circular turret 96 is operably installed for rotation of the turret 96 about an upright rotation axis passing vertically through the center of the vehicle. The circular turret 96 features a central channel 98 recessed into its otherwise flat topside, which resides flush with the surrounding deck surface 94 to form a flat top of the platform. The channel 98 extends diametrically across the turret through the central rotation axis thereof. An extendable/retractable arm 100 is mounted within the channel 98, and is selectively extendable and retractable by a suitable actuator between an extended position reaching outwardly beyond the outer perimeter of the platform and a retracted position withdrawn fully into the confines of the turret's central channel. Between a motor (not shown) operably driving rotation of the turret about its central rotation axis and the actuator operable to extend and retract the arm 100, the turret is rotatable into any one of four different working positions in which the arm 100 is extendable outwardly from a respective one of the vehicle's four perimeter sides. Each storage unit features a central channel recessed in the underside thereof and shaped to accommodate receipt of the extended arm 100 therein in manner temporary coupling the underside of the storage unit to the arm 100, whereupon retraction of the arm draws the storage bin onto the flat top of the vehicle's upper platform 92 from a targeted storage location situated alongside the central shaft of a storage cell stack in which the robotic vehicle currently resides.

To retain the retrieved storage unit on the upper platform 92 of the vehicle, the outer perimeter of the platform is surrounded by four raisable/lowerable fences 102 each residing at a respective perimeter side of the vehicle. A respective actuator is operable to raise and lower each fence. Each fence may occupy a raised position by default, in which case a selected fence is only lowered when extension of the arm 100 at the respective side of the vehicle is required. In its raised state, each fence reaches upwardly beyond the platform to block the carried storage unit from sliding off the platform. In its lowered state, each fence aligns its opening 104 with the channel 98 of the turret.

In one preferred embodiment, the system includes a fleet of robotic storage/retrieval vehicles of the forgoing type. Each vehicle 36 includes suitable receiver by which wireless communication with a wireless computerized control system is possible to control operation of the vehicle fleet. In response to a request for a particular product from the storage system, the controller signals one of the vehicles to retrieve the product from its known storage location in the three dimensional array. The vehicles normally occupy the upper track layout 22 by default, where the vehicle uses the X-side and Y-side conveyance wheels to traverse the upper track layout in two dimensions to reach the appropriate central shaft of the stack in which the target storage location resides. The vehicle retracts its wheel units and transitions into the shaft using the above described procedure, and uses the pinion wheels to travel down the shaft to this target storage location, from which the respective storage unit is then retrieved by operation of the turret and associated arm. With the retrieved storage unit safely retained on the upper platform of the vehicle by the perimeter fences, the vehicle continues downwardly through the shaft to the lower track layout 24, where the wheels are once again extended out and the X-side and/or Y-side conveyance wheels are used to traverse the lower track layout in two dimensions to one of the delivery stations 30. Here, the desired product from the storage unit is removed for subsequent handling and delivery, whether by automated or human means. The vehicle then returns to the upper track layout 22 via one of the outer shafts.

By using only the outer shafts for return of the vehicle to the upper track layout, the central shafts by which storage units are retrieved by downward-travelling vehicles from the upper track layout remain unobstructed by vehicles returning to the upper track layout. During the return of the vehicle to the upper track layout via an outer shaft, the vehicle may carry the same storage unit that it previously delivered to a delivery station back up to the upper track, where the vehicle then travels to a shaft where it descends to a controller-specified storage location where the storage unit is once again placed back into storage. This controller-specified storage location for example may be the same location from which that particular storage unit was previously retrieved.

Figure 11A:
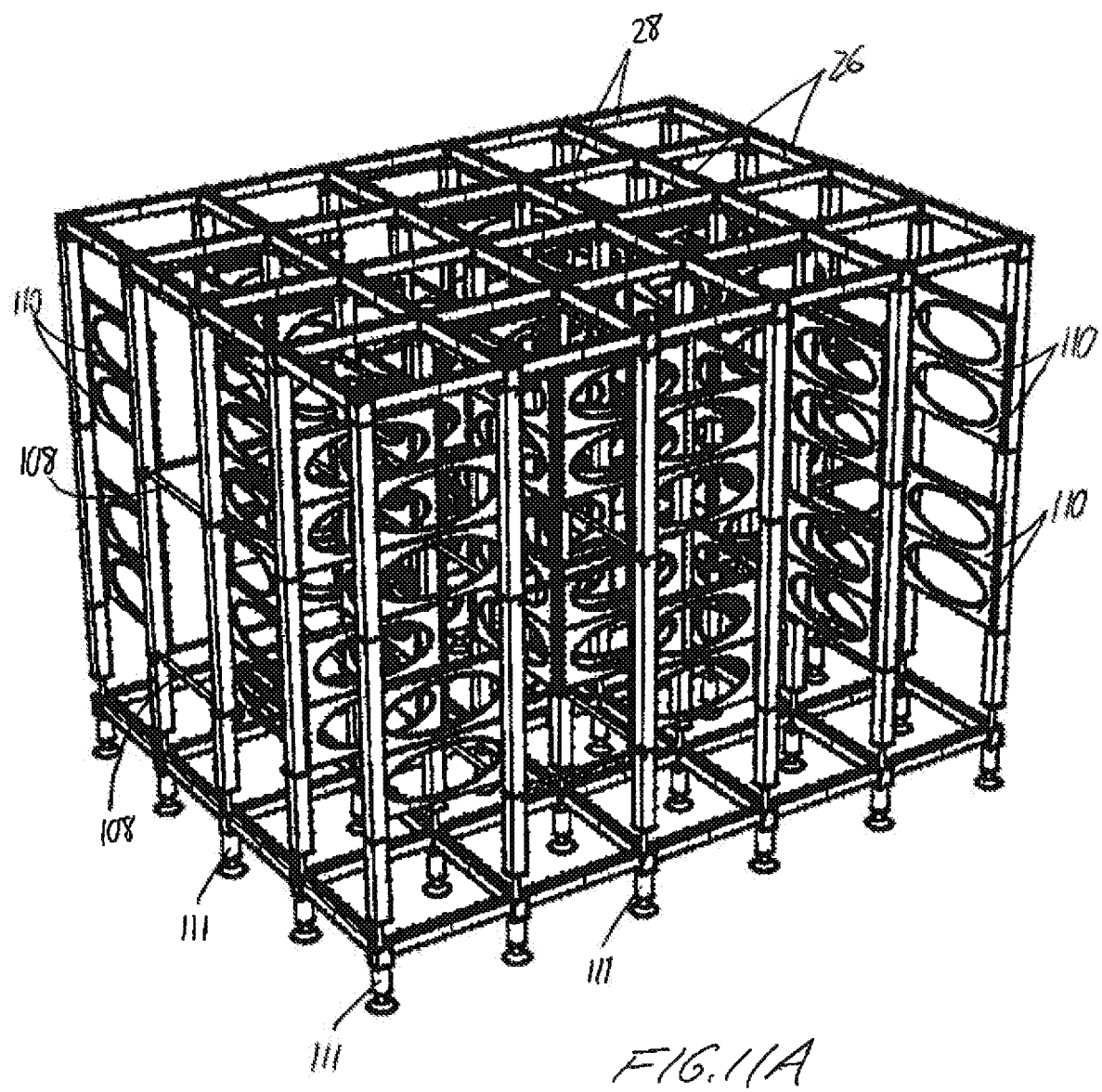
FIG. 11A is a perspective view of another completed grid structure, similar to that of FIG. 5, but showing optional inclusion of internal bars and panels to reinforce the structure and provide fire breaks therein.

Referring to FIG. 11A, in addition to the rails 26, 28 and frame members 32, the framework of the three dimensional grid structure may include connecting bars 108 spanning horizontally between adjacent frame members 32, and may also include connecting panels 110 that reside in vertical planes and likewise span between adjacent frame members to reinforce the three dimensional framework. These connecting panels may also serve as firebreaks or firewalls to create barriers that prevent or inhibit flames from spreading through the structure from one column of storage locations to the next in the event of a fire. Such connecting panels are installed only at the non-access sides of the storage columns, i.e. at sides thereof not directly neighboured by a central or outer shaft, as the sides of the shafts must be left open to allow the vehicles to access the storage locations in each column. As also shown in FIG. 11A, the lower track layout may be elevated off the ground by support legs 111 attached to the lowermost frame pieces of the modular frame members at the bottom of the bases 69 thereof.

Figure 11B:
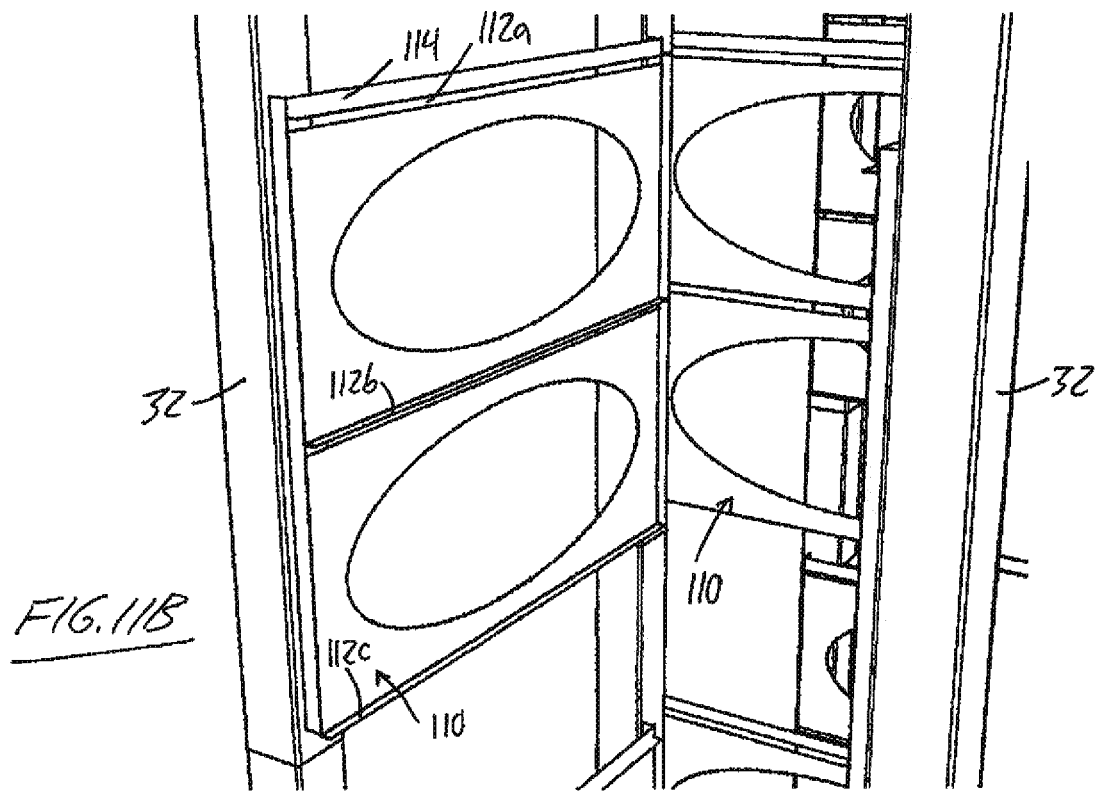
FIG. 11B is a closeup partial perspective view of a partially assembled grid structure features the same panels of FIG. 11A, and showing in-turned flanges on the panels that define shelves for supporting the storage bins in the completed grid structure.
Figure 11C:
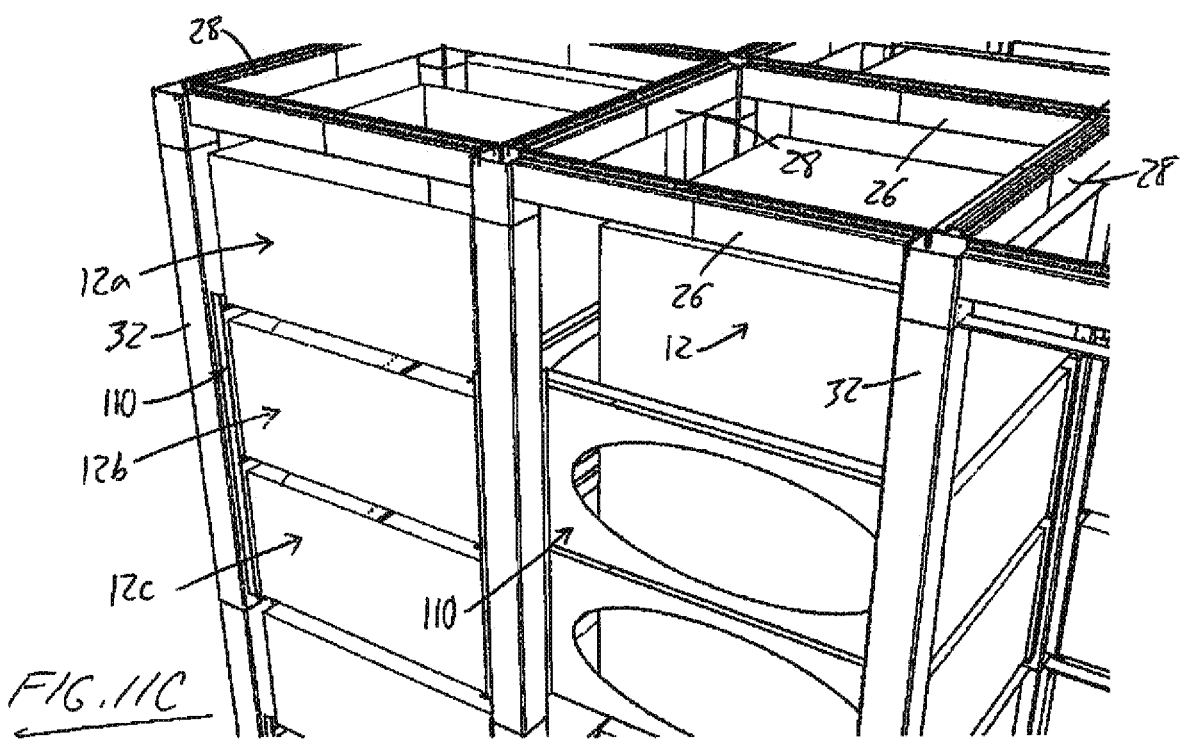
FIG. 11C is another closeup partial perspective view of the partially assembled grid structure of 11B a set of storage bins supported therein by the in-turned flanges of the panels.

Turning to FIGS. 11B and 11C, each connection panel 110 of the illustrated embodiment spans approximately two levels of the grid structure in the vertical Z-direction thereof, and features three in-turned flanges 112a, 122b, 112c spanning horizontally across the panel on the interior side thereof that faces into the respective column of storage locations in the grid structure. These include an upper flange 112a residing near the top edge of the panel 110 at a short height therebelow, a middle flange 112b residing at a generally central height on the panel 110, and a lower flange 112c residing at or near the bottom edge of the panel 110. Each panel is fastened to two frame members 132 at the inner sides thereof that face into the respective storage column at neighbouring corners thereof, whereby the other sides of these frame members 132 are available for mounting of respective panels for neighbouring columns. During assembly of the framework, a set of three panels are installed together at a same elevation on three sides of a storage column, with the fourth side of the storage column being left unobstructed so as to open into the respective central shaft of the three dimensional storage array.

The upper flanges of these three panels form a top shelf for supporting a top one of three storage bins, while the middle flanges and lower flanges of these three panels form middle and lower shelves, respectively, for supporting the other two of these three storage bins. FIG. 11C shows three storage bins in the leftmost column of the figure, which are labelled as upper bin 12a, middle bin 12b, and lower bin 12c. The fact that the upper flange 112a resides a short height below the top edge of each panel 110 leaves a short upper wall area 114 of the panel 110 standing upright from the upper flange 112a in order to block sliding of the upper bin 12a out of the column during insertion of the upper bin back into the storage column by a robotic vehicle. Using the triple-flanged panels 110 of the illustrated embodiment, each set of three panels serves to define three bin-supporting shelves at three respective levels in the three dimensional grid structure, while occupying only slightly more than two levels. It will be appreciated that other embodiments may employ a flanged panel of different height that occupies a greater or lesser number of vertical levels. However, use of multi-flanged panels that define shelving at multiple levels reduces the overall number of individual panels in the completed framework of the finished grid structure.

As the framework of the grid structure includes a respective shelf at each storage location to support the respective storage bin, any given bin can be removed from its storage location by one of the robotic retrieval vehicles without disrupting the bins above and below it in the same storage column. Likewise, this allows a bin to be returned to a prescribed location at any level in the array. It will therefore be appreciated that use of the term 'stack' herein to describe the vertically accumulation of storage bins is not used to explicitly mean direct placement of bins in physical contact atop one another, but rather is used to denote the layering of storage bins in vertical levels, while distinguishing a stack of storage cells from individual columns of storage bins.

That being said, while the illustrated embodiment employs shelving in the framework to enable individual retrieval of a bin from locations other than the uppermost occupied storage location of a column, other embodiments still making use of the unique shaft-access storage cell stacks could alternatively lack any shelving and use direct stacking of bins in physical contact atop one another, for example in the scenario where each column is used to storage the same product (s) in each and every bin in the column. In such an embodiment, retrieval of only the uppermost bin from any column at any given time is sufficient, and each bin could simply be returned back to the top of a given column of storage bins, rather than back to the same storage location from which it was retrieved, as the 'top' of the column of bins may have changed in terms of the absolute height in the three dimensional grid if a second storage bin was removed from that column before return of the first bin back to that column.

Accordingly, although the shaft-based access to a stacked-cell three dimensional storage array has particular advantage in terms of improved balance between space efficiency and individual accessibility when compared to prior art solutions that use either overhead/underneath vehicle grids or aisle-based layouts, use of the presently disclosed storage array is not necessarily limited to applications that specifically provide individual access to any and all storage locations at any time.

In summary of the disclosed embodiments, a storage system is employed within a grid structure that accommodates storage cells that hold storage bins or other storage units. The structure has a top and bottom level and vertical shafts or voids that the cells are built around. The system comprises a vehicle or robot that manoeuvres around the top and bottom of the grid and vertically through the void or shaft and locates a bin to retrieve. The vehicle or robot retrieves a bin from a location within the void or shaft and delivers it to a station at the perimeter of the grid structure at the bottom of the grid. The vehicle or robot, once it has retrieved the bin and completed its task, returns the bin to a designated space within the void or shaft by using the outside of the grid structure to elevate itself to the top of the grid structure, where the vehicle or robot then manoeuvres around the top of the grid structure and descends into a void or shaft to store the bin. The grid structure is scalable in three dimensions to a certain desirable height and grid size, and may be constructed of aluminum or steel columns that are interconnected at the top and bottom by aluminum or steel rails, and braced throughout the structure.

The remotely operated vehicle or robot for picking up storage bins from a storage grid system travels the top grid structure by use of guiding rails and operates in the horizontal X and Y plane, by use of a driving means using four wheels that rotate independently in either direction from each other in the X plane, and four wheels that rotate in either direction independently for the Y plane. The vehicle then retracts four of its wheels on the X side relative to its frame or chassis so as to reduce its track width. In the illustrated embodiment, it achieves this by use of its pulley and cam mechanism, and then by raising its wheels on the Y side of the robot, it lowers its wheels on the X side downwards. In the illustrated embodiment, it achieves this by use a pulley and linear slide mechanism to lower the X side down into the grid or void to engage a gear rack mechanism built into the grid. The vehicle then retracts the wheels on the Y-sides, and using the wheels on the X-side, drives itself downwards until the second set of four wheels on the Y-sides engages the gear rack mechanism. Accordingly, now all eight wheels are engaged on all sides of the void, and said vehicle or robot moves down into the void or vertical plane within the grid structure to an assigned position or bin.

The vehicle or robot uses a turret mechanism that turns to a predetermined position to pick the bin assigned, then extends its telescopically extendable arm and engages the bin underneath and pulls the bin onto its turret at the top platform of the robot. The vehicle or robot will lock the bin in place by raising its fences relative to turret position and travel in the vertical Z direction down to the bottom track layout and move in either the X or Y direction by use of the track's guiding rails to an assigned location on the perimeter of the bottom track layout. Here, the bin may be presented in a different plane 90-180 degrees from its original position.

By use of its four wheels at either the X or Y sides of the robot, it will move towards one of the outer vertical shafts on the perimeter of the structure and raise itself up into the grid by lifting itself into the vertical void, or by assistance of a mechanical lift device or combination of both, whereupon the gear rack mechanism is engaged. It will then drive itself upwards until the second set of four wheels engages the gear rack, by which all eight wheels are then engaged on all sides of the void.

The vehicle or robot now travels upwards in the Z direction on the outside perimeter of the grid structure, and repeats the process of moving in the X and Y direction to its next assigned bin location within the grid structure, as prescribed by the computerized wireless controller.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A storage system comprising:
    a storage/retrieval vehicle; and
    a gridded three dimensional structure comprising:
        a plurality of storage cells arranged in stacks and each comprising a plurality of shelved storage locations disposed around a central void on different respective sides thereof, each unit space being sized to accommodate a respective storage unit therein;
        each stack comprising a respective group of the storage cells residing in stacked relation one over another with the central voids of said respective group of the storage cells aligned with one another to form a respective upright central shaft of said stack;
        each central upright shaft being sized to accommodate the respective storage units of the respectively group of storage cells within said upright shaft to enable retrieval of said respective storage units through said upright central shaft; and
        a gridded track system;
    wherein said storage/retrieval vehicle is configured to travel to and from the upright central shafts on said gridded track system, and is also configured to access the storage locations from within said upright central shafts; and
    wherein the stacks of the gridded structure include full-sided stacks in which the upright central shaft is surrounded by the storage locations of the respective group of storage cells on four sides of said upright central shaft, and said storage/retrieval vehicle is configured for operation in four different working positions inside the upright central shaft of each full-sided stack, and is configured such that in each one of said four different working positions, said storage/retrieval vehicle accesses a storage location on a different respective one of the four sides of said upright central shaft of the full-sided stack, and engages with the respective storage unit stored in said storage location at said different respective one of the four sides of said upright central shaft of the full-sided stack to retrieve the respective storage unit therefrom.

2. The storage system of claim 1 wherein the gridded track system comprises a gridded upper track layout in an overhead location above the stacks and a gridded lower track layout residing beneath the stacks, and said storage/retrieval vehicle is operable to travel, in its entirety, fully through the central upright shafts between the upper and lower track layouts.

3. The storage system of claim 2 further comprising a vehicle control system for operating the storage/retrieval vehicle to perform both retrieval operations removing the storage units from the storage locations and return operations returning the storage units to the storage locations, wherein the gridded structure further comprises additional outer shafts lying parallel to the upright central shafts at perimeter areas of the gridded structure, and the vehicle control system is configured to cause upward conveyance of the storage/retrieval vehicle, in its entirety, through only the additional outer shafts during said return operations.

4. The storage system of claim 3 wherein the control system is configured to cause downward conveyance of the storage/retrieval vehicle, in its entirety, through the upright central shafts during the retrieval operations.

5. The storage system of claim 4 wherein the control system is configured to cause, after upward conveyance to the upper track layout through the additional outer shafts, downward conveyance of the storage/retrieval vehicle, in its entirety, through one of the upright central shafts to complete said return operations.

6. The storage system of claim 1, wherein said vehicle storage/retrieval vehicle comprises a rotatable turret and an extendable arm selectively extendable into a deployed position reaching outwardly beyond a perimeter of said turret, said turret being rotatable into said four different working positions, in each of which the deployed position of the extendable arm extends outwardly from the turret at a different respective side of the vehicle to access the storage locations, and engage with the respective storage units stored therein, on said different respective one of said four sides of the upright central shaft of the full-sided stack.

7. The storage system of claim 6 wherein the storage/retrieval vehicle comprises a platform at which the turret resides for retrieval of any of the storage units onto the storage/retrieval vehicle by extension of the extendable arm into the deployed position at one of the storage locations to engage the respective storage unit therein and pull said respective storage unit onto the platform by retraction of the movable arm.

8. The storage system of claim 7 comprising raiseable and lowerable fences disposed around the platform on four respective sides thereof, wherein a raised condition of the fences is arranged to block sliding of a retrieved storage unit off of the platform, and a respective one of the fences is arranged to move into a lowered condition in each of the working positions of the turret to enable deployment of the extendable arm over said respective one of the fences in said working position.

9. The storage system of claim 1 wherein the stacks are arranged in neighboring pairs of stacks, each neighboring pair of stacks comprising a first stack having a corner area thereof unoccupied by any of the storage locations of said first stack, and a second stack having a respective column of storage locations occupying said corner area of said first stack.

10. The storage system of claim 1, wherein the gridded track system comprises a respective set of rack members standing upright within each upright shaft at perimeter boundaries thereof, the storage/retrieval vehicle comprises a first set of pinion wheels residing on first opposing sides of the storage/retrieval vehicle and a second set of pinion wheels residing on second opposing sides of the storage/retrieval vehicle, and each rack member has two toothed-equipped edges lying perpendicular of one another and facing inwardly of the upright shaft for respective engagement by the first and second sets of pinion wheels of the storage/retrieval vehicle.

11. A storage system comprising a grid structure of storage cells, at least some of which each have four shelved storage locations arranged around a void space to accommodate an arrangement of four bins around a vertical shaft at 90-degrees to one other, the grid structure having a top and/or bottom level, and a vehicle or robot, configured to (a) move horizontally in two dimensions at the top and/or bottom level, (b) move vertically through the void spaces in the grid structure, and (c) from a position within the void space of any one of the cells, deposit or retrieve a storage bin to or from any one of the four storage locations around the void space.

12. A storage/retrieval vehicle for use in a gridded storage structure comprising at least one stack of storage cells in which each storage cell comprises four storage locations situated on four different sides of an upright central shaft of said stack for storing respective storage units within said storage locations in a manner accessible from said upright central shaft by the storage/retrieval vehicle, said storage/retrieval vehicle comprising a rotatable turret and an extendable arm selectively extendable to a deployed position reaching outwardly beyond a perimeter of said turret, said turret being rotatable into four different working positions, in each of which extension of the extendable arm will deploy said extendable arm outwardly from the turret from a different respective side of the vehicle to access a respective one of said four storage locations on said four different sides of the upright central shaft of the stack of storage cells.

13. The storage/retrieval vehicle of claim 12 comprising a platform at which the turret resides and from which the extendable arm is extendable into to the storage locations to engage the respective storage unit therein, and retractable to pull said respective storage unit onto the platform.

14. The storage/retrieval vehicle of claim 13 comprising raiseable and lowerable fences disposed around the platform on four respective sides thereof, wherein a raised condition of the fences is arranged to block sliding of a retrieved storage unit off of the platform, and a respective one of the fences is arranged to move into a lowered condition in each of the working positions of the turret to enable deployment of the extendable arm over said respective one of the fences in said working position.

15. The storage/retrieval vehicle of claim 14 wherein each raiseable and lowerable fence has an opening therein positioned to align with the extendable arm in a respective one of the working positions to enable extension of the arm through said opening.

16. A storage/retrieval vehicle for use in a gridded storage structure comprising at least one stack of storage cells in which each storage cell comprises four storage locations situated on four different sides of an upright central shaft of said stack for storing respective storage units within said storage locations in a manner accessible from said upright central shaft by the storage/retrieval vehicle, said storage/retrieval vehicle comprising a platform for receiving a storage unit thereon, and raiseable and lowerable fences disposed around the platform on four sides thereof, wherein a raised condition of the fences is arranged to block sliding of a retrieved storage unit off of the platform, and the storage/retrieval vehicle is operable in four different working positions each enabling loading or unloading of a storage unit onto or off the platform by placing of a respective one of the raiseable/lowerable fences in a lowered condition at a respective one of the four sides of the platform, wherein each of the fences has an opening positioned therein to align with an extendable arm that is operable to reach through said opening to pull a storage unit onto the platform in the lowered condition of the raiseable and lowerable fence.

17. The storage system of claim 1 wherein the storage/retrieval vehicle is configured to travel, in its entirety, through the upright central shafts.

18. The storage system of claim 11 wherein the vehicle or robot is configured to travel, in its entirety, vertically through the void spaces.

19. A storage system comprising:
a gridded three dimensional structure comprising:
a plurality of storage cells arranged in stacks and each comprising a plurality of storage locations disposed around a central void on different respective sides thereof, each unit space being sized to accommodate a respective storage unit therein;
each stack comprising a respective group of the storage cells residing in stacked relation one over another with the central voids of said respective group of the storage cells aligned with one another to form a respective upright central shaft of said stack;
each central upright shaft being sized to accommodate the respective storage units of the respectively group of storage cells within said upright shaft to enable retrieval of said respective storage units through said upright central shaft; and
a gridded track system; and
at least one storage/retrieval vehicle conveyable via the gridded track system to, from the upright central shafts to access the storage locations therefrom;
wherein the stacks of the gridded structure include full-sided stacks in which the upright central shaft is surrounded by the storage locations of the respective group of storage cells on all sides of said upright central shaft, and said storage/retrieval vehicle is operable in a plurality of different working positions inside the shaft of each full-sided stack to access the storage locations on said all sides of said upright central shaft of the full-sided stack; and
wherein said vehicle storage/retrieval vehicle comprises a rotatable turret and an extendable arm selectively extendable into a deployed position reaching outwardly beyond a perimeter of said turret, said turret being rotatable into four different working positions, in each of which extension of the extendable arm will deploy said extendable arm outwardly from the turret at a different respective side of the vehicle to access a different one of the storage locations on said all sides of the upright central shaft of any one of the full-sided stacks.

20. The storage system of claim 19 wherein the storage/retrieval vehicle comprises a platform at which the turret resides for retrieval of any of the storage units onto the storage/retrieval vehicle by extension of the extendable arm into the deployed position at one of the storage locations to engage the respective storage unit therein and pull said respective storage unit onto the platform by retraction of the movable arm.

21. The storage system of claim 20 comprising raiseable and lowerable fences disposed around the platform on respective sides thereof, wherein a raised condition of the fences is arranged to block sliding of a retrieved storage unit off of the platform, and a respective one of the fences is arranged to move into a lowered condition in each of the working positions of the turret to enable deployment of the extendable arm over said respective one of the fences in said working position.

22. The storage system of claim 21 wherein each of the fences has an opening positioned therein to align with an extendable arm that is operable to reach through said opening to pull a storage unit onto the platform in the lowered condition of the raiseable and lowerable fence.

23. A storage system comprising:
a gridded three dimensional structure comprising:
a plurality of storage cells arranged in stacks and each comprising a plurality of storage locations disposed around a central void on different respective sides thereof, each unit space being sized to accommodate a respective storage unit therein;
each stack comprising a respective group of the storage cells residing in stacked relation one over another with the central voids of said respective group of the storage cells aligned with one another to form a respective upright central shaft of said stack;
each central upright shaft being sized to accommodate the respective storage units of the respectively group of storage cells within said upright shaft to enable retrieval of said respective storage units through said upright central shaft; and
a gridded track system; and
at least one storage/retrieval vehicle conveyable via the gridded track system to, from and through the upright central shafts to access the storage locations therefrom;
wherein the stacks of the gridded structure include full-sided stacks in which the upright central shaft is surrounded by the storage locations of the respective group of storage cells on all sides of said upright central shaft, and said storage/retrieval vehicle is operable in a plurality of different working positions inside the shaft of each full-sided stack to access the storage locations on said all sides of said upright central shaft of the full-sided stack; and
wherein the gridded track system further comprises a respective set of rack members standing upright within each upright shaft at perimeter boundaries thereof, the storage/retrieval vehicle comprises a first set of pinion wheels residing on first opposing sides of the storage/retrieval vehicle and a second set of pinion wheels residing on second opposing sides of the storage/retrieval vehicle, and each rack member has two toothed-equipped edges lying perpendicular of one another and facing inwardly of the upright shaft for respective engagement by the first and second sets of pinion wheels of the storage/retrieval vehicle.

* * * * *